Nov. 11, 1958

C. W. OSMUN 2,860,019

PACKING OR SEALING STRUCTURE

Filed June 11, 1957

INVENTOR.
CHARLES W. OSMUN

BY *Golrick & Golrick*

ATTORNEYS

United States Patent Office 2,860,019
Patented Nov. 11, 1958

2,860,019

PACKING OR SEALING STRUCTURE

Charles W. Osmun, Port Huron, Mich.

Application June 11, 1957, Serial No. 665,093

11 Claims. (Cl. 309—29)

The present invention is concerned generally with means for slidably sealing one member with respect to another and is more particularly concerned with a packing or sealing structure for attaining a sliding seal between a piston or similarly reciprocable member and a surrounding cylindrical wall.

By the present invention there is provided a simple packing or sealing construction adapted for use in such environments as those in which piston rings as well as other types of packing are applied for sealing of one reciprocating element with respect to another. Considering for example the application of the invention as a piston ring in a pump of usual metal construction, a piston element is provided with a circumferential groove wherein are located a pair of like O rings, and sandwiched therebetween an expansible metallic piston ring structure, which may be one of several known commercial types, involving either a single ring or plurality or assembly of rings serving as one ring. The metal ring structure alone is relied upon for the sliding seal to the wall of the cylinder, the function of the O rings being rather to provide a non-sliding seal of the metal piston ring to the piston element. Preferably the O rings are of such annular cross section and physical characteristics that under no conditions of operation is there any contact of the O rings with the cylinder wall. Accordingly, the hardness of the O ring elastomeric material is chosen relative to the diameter of the annular O ring section, the metal piston ring dimensions, and groove dimensions so that no flow or distortion under rated operating pressures will cause an O ring to be expressed or extruded into contact with the cylinder wall.

It is preferred that the axial dimension or width of the slot receiving the packing be selected with respect to the annular sectional diameters of the O ring and the axial length or thickness of the metal ring so that even under static conditions, that is, with the piston stationary and under no pressure, the O rings seal against respective radial end faces of the metallic ring and adjacent walls of the piston groove. Preferably for simplicity in attaining correct positioning of the O rings in proper sealing relation to the metal ring and piston, the internal diameter of the O rings is selected with respect to the groove bottom diameter so that the O rings seat lightly circumferentially around the groove bottom, and also provide a further area of sealing contact with the piston member.

In like fashion a packing or sealing structure according to this invention may be provided in an internal groove of a stationary wall or bore through which a reciprocating rod is passed, as for example at the end wall of a double acting pump with a piston rod extending therethrough. In this case a contractile type metallic ring is located in an internal groove formed in the bore and O rings are provided to sandwich the metal ring in sealing relations in manner analogous to that described for a piston ring type seal. In this case again only the metal ring is relied upon for sliding sealing contact with the reciprocating rod while the O rings provide the seal between the groove surfaces and the corresponding radial end faces of the metallic ring.

Generalizing upon such examples, a contractile or expansible split ring of relatively rigid hard material is sandwiched between soft elastic O rings. The particular requirements of the elements in the sealing structure here described as to type of material will understandably vary with the fluids and operating conditions involved in the sealed system. Thus the chemical nature of the fluid, the operating speeds, pressure and temperature may dictate a particular choice of O ring elastomer.

The present structure has decided advantages over one and another of the various types of seals hitherto proposed for like environments, among which have been included structures comprising O rings as part of the ensemble. The present structure conduces to simplicity of production of the machine elements involved in the apparatus embracing this seal. Thus insofar as the piston is concerned, where the piston is to carry the sealing device, it is merely required that a single simple groove form be machined with radial side walls and generally cylindrical flat bottom, having only two dimensions of concern in the machining operation, the depth of the groove and its length.

Further it has been found that the present structure is adaptable for use in pneumatic type systems, whether involving air or volatile gases; and also for use in hydraulic systems in the broad sense moving one type of liquid or another. Further with suitable choice of materials, application of this invention is quite feasible in environments involving quite different operating temperature ranges. Thus a wide use of the invention is clearly possible: in reciprocating pumps for liquids; air compressors; reciprocating motors of the air or hydraulic cylinder type; shock absorbers and indeed even with certain types of internal combustion engines.

Further advantage of the instant seal construction arises in consequence of the minimal area of metal-to-metal sliding contact involved in a seal of given pressure rating. Thus for example, less heat is generated at the sealed area; a lower rate of wear of a cylinder bore or reciprocating rod by the sealing means is attained; and also due to a generally lower frictional loss than with comparable seals, the power loss at the seal is further minimized. Lubricant consumption between the reciprocating parts may be further lowered particularly due to the lower operating temperature.

Generally speaking the aforementioned advantages will arise for either type of seal contemplated; that is, for the piston ring type carried by the piston, or that located in a bored element and contractile about a reciprocating rod or the like.

The general object of the invention is then the provision of a simple packing or sealing construction between relatively reciprocating mechanical elements. Another object is the provision of a seal for the contemplated use which in structure leads to lower cost both in fabricating operations and material cost. A further object is the provision of a seal structure of long life and excellent pressure seal characteristics. A still further object is the provision of a relatively simple low cost seal construction which in the environment contemplated generally results in a lower frictional power loss, lower heat generation, diminished lubricant demand, as well as a lower rate of wear between the mechanical elements sealed thereby. Other objects and advantages of the invention will appear from the following description and the drawings wherein:

Figure 1:
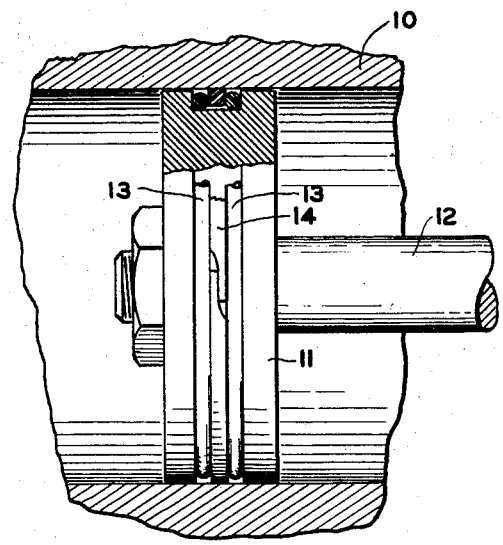
Fig. 1 shows the present invention as embodied in a piston ring type construction, with a surrounding cylinder wall being shown in fragmentary form and certain portions of the piston and seal elements being broken away for clarity of representation.

In Fig. 1 of the drawings there is shown in outline or generalized form and in axial section, a portion of a cylinder 10 wherein there is reciprocable the piston 11 carried by a piston rod 12. The piston is, of course, secured on the rod in any suitable manner. The piston is circumferentially grooved to receive the elements of the seal construction of this invention, comprising a pair of O rings 13 between which is sandwiched a single metallic piston ring 14, of the double-sealing type. As may be observed more clearly from the fragmentary detail of Fig. 2, the metal ring alone bears as a sliding seal upon the cylinder wall, and it in turn is sealed at its axial end faces through the O rings to the piston at the bottom and side wall surfaces of the groove. The O rings themselves however are so dimensioned and disposed in the groove that they do not come in contact with the wall of the cylinder. Where, as in Figs. 1 and 2, a single metal ring is used between the O ring pair, the metal ring should be of the double-sealing construction which is commonly used and commercially available in cast iron piston rings. One form of this double-sealing construction, which concerns the design of the region where the ring is split, appears in Fig. 3. There it may be seen that the ring, in annular cross section rectangular or more specifically square, has mating or complementarily formed ends which overlap in two senses, axially and radially, when the ring is compressed into normal operational size and shape.

Considering one end of the split ring, half the width of the ring is milled away to a depth half or more of the radial thickness to form what might be termed a rabbet 16; and on the inner side, the ring is milled away across its entire width out to and for about half the length of the rabbet 16, forming an endwise projecting tongue 15. Thus the tongue 15 of each end seats in the rabbet or groove 16 of the other end to form an axial overlap along the milled radial surface of the tongues and rabbets; and also to form an overlap in radial sense of each tongue over the bottom surface of the rabbet of the other end.

Figure 2:
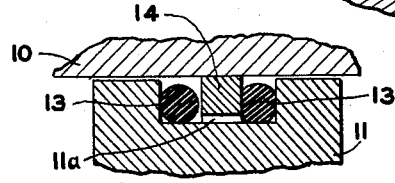
Fig. 2 is an enlarged fragmentary radial section of the piston at the area of the seal assembly showing also a relation assumed by the elements under one type of operating conditions.
Figure 3:
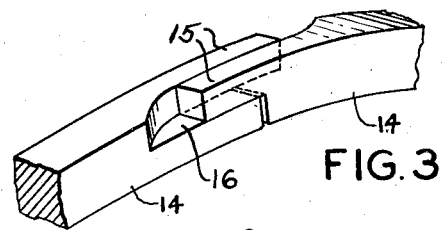
Fig. 3 is an enlarged fragmentary detail of the region of the ring split in one type of metal ring used in the structure of Figs. 1 and 2.
Figure 4:
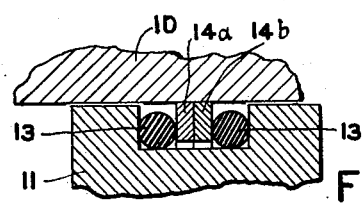
Fig. 4 is a fragmentary view similar to Fig. 2 wherein two split rings of another form are used rather than the single ring of Figs. 1–3.
Figure 5:
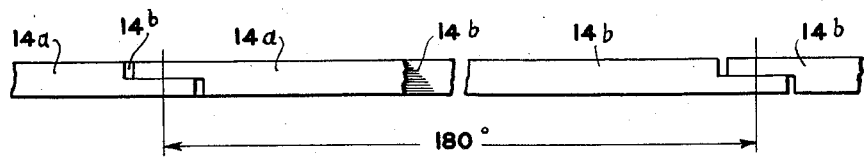
Fig. 5 is a fragmentary development of the axial end faces of the paired metal ring structure of Fig. 4.

The form of the invention shown in Figs. 4 and 5 is similar to that described with respect to Figs. 1 and 2, except that in place of the double-sealing metal ring above described, a pair of like metal rings 14a, 14b are used, each with a lateral step cut forming an overlap in radial sense. These rings are shown as each having half the width of the metal ring of Fig. 1. Since each ring has only the simple stepped overlap, upon installation the split regions of the rings are displaced around the piston preferably at 180° from each other. The relative disposition of these rings, and the form of the ends is shown in detail in the fragmentary developed axial end view of Fig. 5. Here the double-seal effect of the metal ring structure of Figs. 1–3 is obtained by use of two rings with displaced splits as shown.

Depending upon operating conditions contemplated, the piston slot width and total axial extent of metal and piston ring sections of Figs. 4–5 may be chosen so that even under static conditions the O rings are under axial compression. This will further frictional maintenance, through the O rings, of the displaced relations of the split regions of the metal rings.

Figure 6:
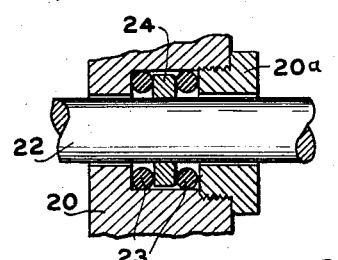
Fig. 6 shows in axial sectional view an embodiment of the invention where the seal is located in an internal circumferential groove in a bore through which a reciprocating rod is passed.

In Fig. 6 there is shown an analogous use of the invention where packing is to be disposed in an internal groove of a cylindrically bored wall 20 through which a reciprocating rod 22 is passed, as for example in the case of a piston rod extending through a cylinder end wall of a double acting pump or the like. In this case the metal ring 24 is of the contracting type to form a circumferential sealing engagement with the reciprocating rod relied upon for the sliding seal. Again the O rings 23 disposed in the internal groove form a non-sliding seal between the ring 24 and the radial groove walls and preferably also with the cylindrical groove bottom. Here, however, the external diameter of the O rings is chosen with respect to the extreme diameter of the groove bottom to locate the O rings properly upon installation with respect to the metal ring means. The double-sealing type construction is used at the split region. Analogously to the showing of Figs. 4 and 5, the metal ring means may be of double ring type, each ring then having the simple lateral step cut at the region of the split, but the split regions against being displaced from each other.

In Fig. 6, the "groove" receiving the metal and O rings as shown as formed by a counterbore into the right side of the wall 20, threaded to a part of its depth, and provided with a hollow plug 20a threadably engaged therein, with the inner flat end of the plug spaced from a radial shoulder formed at the bottom of the counterbore. This facilitates, and in some cases is necessary to permit, installation of the several rings, where the radial thickness of the rings is relatively large in comparison with say the rod 22. As an example of installation procedure, with plug 20a removed and the rod 22 in place through wall 20, the innermost O ring, the metal ring means 24 and the outer O ring are successively inserted into the counterbore about the rod 22, and finally the plug 20a is threaded into place. Any suitable means for securing the plug may be used as required to maintain the proper axial spacing of the parallel radial "groove" walls. Of course the design of particular machine elements may indicate another manner of installation.

Moreover, where the particular size relations of the metal ring permits such displacement of the split end region that the metal ring may be compressed without damage to a diameter permitting insertion through the bore of wall 20, a simple internal groove may be used. In such case the metal ring is first installed, then the O rings, and finally the rod 22 is piloted by apt means through the metal ring.

As shown exaggerated in Fig. 2, when the piston is moving in one or the other direction, in consequence of frictional force developed between the cylinder wall and the metal ring, the latter is displaced slightly in axial sense within the groove, thereby compressing one O ring axially, thereby distorting the same to attain a larger area of radial sealing contact between the O ring, the adjacent radial faces of the metal ring structure and of the groove. This provides an effective seal of the metal ring to the piston, even though the metal ring is displaced out of contact with the other O ring. In the preferable construction, where each O ring seats on the groove bottom, even when uncompressed by axial movement of the metal ring means, such axial compression of an O ring also causes a similar increase in the area of sealing contact of the O ring with the groove bottom. Not only are increased areas of sealing contact thus developed, but also the contact pressures may be increased to further the sealing function. Under some conditions where the sealing function is called into operation fluid pressures at the packing may tend to displace the metal ring means and to cause axial O ring compression with similar effective increase of the areas and contact pressures involved in the O ring sealing contacts.

The exaggerated showing of Fig. 2 as to the left O ring is indicative of the condition where the piston moves toward the left with little or negligible resisting fluid pressure, rather than where the piston is working against the fluid pressures to be expected in normal operation. In the latter situation, the pressure would tend to flatten radially the O ring thereby in most cases taking up all of the axial clearance shown between the metal ring and left side O ring.

Insofar as the metal ring specifications are concerned, these may in general be determined from ordinary design considerations, modified by the fact that for given fluid pressures and speeds of operation, less metal-to-metal contact area is required between metal rings and cylinder wall (or between rod and rings) than with ordinary piston ring seals. The metal rings may be steel, cast iron, brass or alloy compositions as required by the chemical nature of the fluids—gaseous or liquid—that are to be handled; or as dictated from friction considerations by the material used in the cylinder wall (or reciprocating rod) with which the rings are in sliding contact.

The O rings may be formed of diverse resilient rubber-like materials, chosen again for any chemical or heat resistance indicated as desirable either by the nature of fluids handled or by operating temperatures. A wide choice of materials is now available for these resilient rings, herein termed O rings, the physical and chemical properties of which are well known to the art. Thus natural rubber, neoprene or other hydrocarbon type synthetic materials may be used for air systems, water systems or other fluids not chemically detrimental to the O ring material at the temperatures of operation. Where hot gases are encountered in the sealed system, choice may be made for example among temperature resistant silicon containing polymers.

In the following table there are presented the dimensions in inches of the piston groove, O-rings and sizes of single cast iron piston rings of a double-sealing type for nominal 3 inch, 4½ inch and 6 inch cylinder bores, which have been found satisfactory.

| | Inches | Inches | Inches |
|---|---|---|---|
| Nominal Size of Cylinder | 3 | 4½ | 6. |
| Bore diameter | 3.030 | 4.530 | 6.030. |
| Piston diameter | 3.025 | 4.525 | 6.025. |
| Groove width | 0.375 | 0.580 | 0.770. |
| Groove depth | 0.156 | 0.218 | 0.296. |
| O Ring (O. D., I. D., width) | 2¹⁵⁄₁₆ x 2¹⁄₁₆ x ⅛ | 4⅜ x 4 x ³⁄₁₆. | 5¾ x 5¼ x ¼. |
| Piston Ring (O. D., cross section) | 3.030 x ⅛" sq. | 4.030 x ³⁄₁₆" sq. | 6.030 x ¼" sq. |

The O rings in the above cases were of synthetic rubber having about 70 Durometer hardness for operations up to 125 p. s. i. pressure. Where a higher operating pressure rating is indicated, a somewhat greater Durometer value would be indicated, say about 90 for some 250 p. s. i. pressure conditions. The length of the piston wherein the groove is centered did not appear critical, for even a one inch length in the 3 inch piston for example was satisfactory; but for better balance, and longer wear of the seal structure, about two inches length appears preferable.

From the above table it may be seen that the O ring section is chosen to be smaller than the piston ring radial depth or thickness. Also the groove width is taken as the sum of the nominal axial dimensions of the three rings. However it is to be noted that the diameter of the annular cross section of the O ring is actually some thousandths of an inch greater than the nominal fractional value would indicate; for example in the 3 inch cylinder, the O ring with nominal ⅛ inch section diameter has an actual value of about 0.139 rather than 0.125 inch. Thus the O-rings in the above examples are all under slight axial compression even upon initial installation static conditions. The depth of the groove is such that the diameter of the groove is greater than the O ring internal diameter, so that the O rings seat circumferentially on the groove bottom and are under some tension upon initial installation. However it has been found by actual tests that in the case of 4½ and 6 inch cylinders, with the internal diameter of the O ring exceeding the diameter across the groove, although the O ring does not so seat on the groove bottom, that excelent performances could be attained under extensive testing with air once an initial air pressure was applied at opposite ends of the cylinder to cause the rings to bottom in the grooves.

As a broad statement of the minimum conditions or relations required for satisfactory performance in various environments of use, it may be said that the O rings are selected as to dimensions so that they will not come into contact with the surface with respect to which the seal structure is translated, leaving the metal ring as the sole sliding seal; and further with respect to the groove and metal ring dimensions, so that when the elements are in place in the groove there is certainty of a complete circular contact (apart from a line of discontinuity in the split metal ring structure) of an O ring with the adjacent radial face of the metal ring, and with the adjacent radial groove wall. Because of the certainty of performance thereby attained without particular special procedures in starting a machine incorporating this seal, it is also preferable by far that the axial dimensions in the seal elements be chosen for slight axial compression of the O rings upon installation in the groove.

By way of example of performance of a seal of this invention in a double acting pump or power cylinder set up, a 3 inch cylinder having a piston with seal of the above design specifications and an 8 inch stroke was run free for a half million cycles at 60 cycles per minute with the lubrication usually employed for an air power cylinder; a Norgren lubricator being used for supplying oil to the cylinder at the rate of one drop per 5 or 6 cycles. Every eight hours the test was interrupted to check the cylinder from both ends for air by-pass or leakage, and the seal was found to be excellent.

After the test cylinder was disassembled for inspection, it was cleaned, reassembled with the same seal elements, and run under the same conditions of speed and lubrication for another half million cycles under a simulated load. The loading was provided by connecting the opposed aligned ends of the piston rods of the test cylinder and of another like cylinder and piston unit of identical bore and permitting a like stroke which, however, had an asbestos type piston packing. Also the ports of the work cylinder were reduced in diameter to ¹⁄₁₆ inch openings. Thus the piston in the second cylinder was reciprocatingly driven and a load was provided simulating operating pressure. Here again inspection for air leakage showed the seal to be excellent as in the first half million cycle test run.

After disassembly and cleaning, the test cylinder was lubricated with cylinder oil and "Molycote," reassembled with the same piston, piston rings and O rings, and the test was continued for another half million cycle run under the same conditions as those used for the second run, but with the lubricator removed and with no provision for lubrication whatsoever beyond the lubricant applied at reassembly.

In all test runs inspection of the cylinder from both ends for air leakage under applied pressure as above indicated, showed no leakage of air through the seal. The piston ring, O rings and cylinder were found to be in perfect condition, with only a slight polishing of the piston ring being apparent as a change from its original condition. Furthermore at the end of the third half million cycle test run, which relied only upon the initially applied lubricant, it was found that substantially all of the original lubricant was yet present in the cylinder in perfect condition indicating the minimum lubricant consummation involved in use of this seal.

On 4½ and 6 inch cylinder designs similar to those above listed, shorter test runs again showed all parts to be in perfect condition at the conclusion of such tests with excellent seal performance achieved throughout.

I claim:

1. A structure for slidably sealing a first member having an internal cylindrical surface to a second member having a cylindrical external surface and coaxially disposed relative to the first member for relative reciprocation, the combination of one of said members having in its cylindrical surface a circumferential groove, split elastic metallic ring means in said groove self-urged into sliding circumferential sealing engagement with the cylindrical surface of the other member, and a pair of O rings disposed on axially opposite sides of said metallic ring means for sealing said means with respect to groove surfaces of the said one member.

2. A structure as described in claim 1 wherein the groove is formed in the member having the internal cylindrical surface.

3. A structure as described in claim 1 wherein the groove is formed in the member having said external cylindrical surface.

4. A structure as described in claim 1 wherein said means comprises a single double-sealing split ring.

5. A structure as described in claim 1 wherein said means comprises a plurality of split metal rings with the split regions thereof rotationally displaced.

6. A structure for slidably sealing a first member having a cylindrical bore surface to a second member having a cylindrical external surface and coaxially disposed relative to the first member for relative axial reciprocation, the combination of one of said members having in its cylindrical surface a circumferential groove with substantially radial opposite groove wall surfaces, split elastic metal ring means in said groove self-urged into sliding circumferential sealing engagement with the cylindrical surface of the other member, and a pair of O rings disposed entirely within said groove on opposite sides of said metal ring means for sealing the metal ring means with respect to the radial groove wall surfaces of the said one member, the width of said groove being substantially the sum of the unstressed axial dimensions of said rings and ring means.

7. A seal structure as described in claim 6 wherein said groove is formed in the member having said external cylindrical surface, said groove having a cylindrical bottom surface with radius less than the radius of said bore diminished by the radial extent of the cross section of said metal ring.

8. A structure for slidably sealing a first member having an internal cylindrical surface to a second member having a cylindrical external surface and coaxially disposed relative to the first member for relative reciprocation, the combination of one of said members having in its cylindrical surface a circumferential groove, split elastic ring means in said groove self-urged into sliding circumferential sealing engagement with the cylindrical surface of the other member, a pair of similar continuous rings disposed entirely within said groove on opposite sides of said split ring means for sealing the split ring means with respect to the groove surfaces of the said one member, said continuous rings being more soft and elastically deformable relative to said split ring means.

9. A structure for slidably sealing a first member having an internal cylindrical surface to a second member having a cylindrical external surface and coaxially disposed relative to the first member for relative reciprocation, the combination of one of said members having in its cylindrical surface a circumferential groove with radial walls, split elastic metallic ring means in said groove self-urged into sliding circumferential sealing engagement with the cylindrical surface of the other member, said ring means presenting radial end faces, and a pair of similar resiliently compressible rings circular in cross section disposed in said groove on axially opposite sides of said metallic ring means for sealing said means with respect to the groove surfaces of the said one member; the axial dimension of said groove being slightly less than the sum of the corresponding normal dimensions of said ring means and rings, whereby each ring has a substantially circumferential contact with the adjacent radial faces of the groove and said ring means.

10. A seal structure as described in claim 9 wherein the groove is formed with a cylindrical bottom surface, and wherein said rings each have a substantially circumferential contact with the groove bottom surface.

11. A seal structure as described in claim 10 wherein the groove is formed in the member having said external cylindrical surface.

References Cited in the file of this patent
UNITED STATES PATENTS

| | | |
|---|---|---|
| 451,209 | Ellithorpe | Apr. 28, 1891 |
| 2,349,170 | Jackman | May 16, 1944 |
| 2,762,668 | Meijer et al. | Sept. 11, 1956 |